3,629,131
PROCESS FOR PRODUCING EUROPIUM-ACTI-
VATED YTTRIUM VANADATE PHOSPHORS
James E. Mathers, Ulster, and Felix F. Mikus and Emil J.
Mehalchick, Towanda, Pa., assignors to Sylvania Electric Products Inc.
No Drawing. Filed Nov. 12, 1969, Ser. No. 876,051
Int. Cl. C09k 1/44
U.S. Cl. 252—301.4 R          6 Claims

ABSTRACT OF THE DISCLOSURE

An improved process for manufacturing europium-activated yttrium vanadate phosphor containing a bismuth additive is disclosed that comprises forming a mixture of yttrium and europium sources that have low levels of certain rare earth impurities, a bismuth source at specific levels and ammonium metavanadate having a specific bulk density and a low level of metallic impurities and thereafter heating the mixture for at least two hours at specific temperatures to achieve a phosphor having an increased brightness and an acceptable color purity.

BACKGROUND OF THE INVENTION

Field of the invention

This invention relates to europium-activated yttrium vandate cathodoluminescent phosphors. More particularly, it relates to an improved process for preparing improved yttrium vanadate phosphors with a higher brightness while maintaining acceptable color purity.

Prior art description

The europium-activated yttrium vanadate phosphors are generally prepared by forming a mixture of a yttrium source such as yttrium oxide or yttrium oxalate, a europium source such as the oxide or oxalate and a vanadium source such as ammonium metavanadate or vanadium pentaoxide and thereafter heating the mixture to a temperature of about 700 to about 1000° C. in an oxidizing atmosphere.

The resulting product was a brighter red-emitting cathodoluminescent phosphor than any red-emitting phosphor previously known. In U.S. Pat. 3,243,625 there is disclosed a cathode ray tube using the europium-activated yttrium vanadate phosphor. The phosphor was improved by the addition of minor amounts of bismuth. In U.S. Pat. 3,360,674 the improved phosphor is described. In the improved phosphor disclosed therein the level of bismuth had an effect upon brightness and color of the red-emission. In commericial cathode ray tubes used in color television, the color of the red-emission as well as the color of the blue-emitting and green-emitting phosphors after fabrication must be balanced with the brightness of each to produce an acceptable color display. The brightest phosphor disclosed therein is not, in some instances, the best color television phosphor from a color purity standpoint. In commercial practice, therefore, a balance was achieved between brightness and color purity. The later phosphor was used as the red-emitting phosphor for the majority of color television cathode ray tubes manufactured for a period of about 5 years from 1964 to 1969.

Recently, there has been a desire to increase the brightness of the red-emitting phosphor even further while maintaining an acceptable color purity, particularly since recent advances in the green-emitting phosphors, in the methods of applying phosphors and other improvements would enable a sizeable increase in overall brightness of the display. The phosphors heretofore produced do not enable the desired overall brightness of the display system to be achieved in some instances and still maintain an acceptable color purity. Therefore, in at least some cathode ray tubes display devices there is a need for a red-emitting phosphor having an acceptable color purity and an increase in brightness over the europium-activated yttrium-vanadate with the bismuth additive previously used. Although the rare-earth-activated rare earth oxides such as europium-activated yttrium oxide and europium-activated gadolinium oxide are generally brighter phosphors than yttrium vanadate there are problems involved in depositing these phosphors on screens and recovery of the phosphor in a usable form that do not exist for the yttrium vanadate.

It is believed, therefore, that a process for producing a europium-activated yttrium vanadate phosphor that has an acceptable color purity and appreciable increase in brightness over that heretofore produced would be an advancement in the art.

SUMMARY OF THE INVENTION

In accordance with one aspect of this invention there is provided a process for producing an improved europium-activated yttrium vanadate phosphor. The process comprises forming a relatively uniform mixture of a specific yttrium source, a europium source, a bismuth source and an excess amount of a specific ammonium metavanadate and heating to a controlled temperature. More particularly, the yttrium and europium sources must contain less than about 75 p.p.m. of any of the other rare earths as contaminants and less than about 5 p.p.m. of cerium and less than about 25 p.p.m. of terbium and praseodymium. The purified ammonium metavanadate has a bulk density of less than about 8 grams/cubic inch and contains less than about 0.01% metallic impurities. The ammonium metavanadate is used in amounts of from about 140% to about 180% of the stoichiometrically equivalent amount based on the production of yttrium and europium vanadate that is from about 40% to about 80% excess. The europium is present in molar ratios of europium to yttrium of from about 4.0:96.0 to about 5.5:94.5. From about 600 p.p.m. to about 900 p.p.m. of bismuth, based on the weight of yttrium oxide is used. The mixture of the foregoing specific materials is heated to a temperature of from about 1750° F. to about 1800° F. for at least about 120 minutes to thereby form a red-emitting yttrium vanadate phosphor having a brightness at least about 20% greater than the bismuth additive europium-activated yttrium vanadate of the prior art.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

To attain the improved phosphors of the present invention it is necessary that the rare earths used as the host and the activator be highly pure. The total amount of rare earth impurities or contaminants must be less than about 75 p.p.m. based on the weight of yttrium calculated on the basis of $Y_2O_3$. Furthermore, the presence of certain impurities are extremely detrimental to the brightness of the phosphors that are produced, thus it is necessary that the cerium content be less than about 5 p.p.m. and the combined content of terbium and praseodymium be less than about 25 p.p.m. based on yttrium (oxide basis). In general, lower purities will achieve higher brightness, however, purification to levels much lower than 50 p.p.m. on an overall rare earth content basis is impractical if not impossible to achieve by the use of known techniques that are economically feasible.

The ammonium metavanadate that is currently commercially available contains metallic impurities greater than about 0.07% by weight and as such does not enable the production of high brightness phosphor.

The metallic impurities that are found in commercial grade ammonium metavanadate are given below in comparison with an ammonium metavanadate that has been purified by recrystallization.

| Metallic impurity | Commercial grade, percent | Purified, percent |
|---|---|---|
| Ag | .0001 | .0001 |
| Al | .005 | .0005 |
| Ca | .005 | .0005 |
| Cr | .005 | .0005 |
| Cw | .0001 | .0001 |
| Fe | .05 | .0002 |
| Mg | .0005 | |
| Mo | .0005 | |
| Mn | .0005 | |
| Pb | .0005 | |
| Si | .005 | .005 |
| Total | 0.0722 | 0.0069 |

Additional purification is required to reduce the metallic impurity content to below about 0.01% by weight. Generally, recrystallization is sufficient to purify the ammonium metavanadate. The lower metallic impurity content enabled a brightness increase of about 5–10%. Additionally the bulk density of the ammonium metavanadate should be less than 8 g./cu. in. and preferably below 6 g./cu. in. Ammonium metavanadate is used in excess amounts. Amounts of from about 140% to about 180% of the theoretical stoichiometric amount required to convert all of the yttrium and europium present to the vanadate is used. About 160% to about 165% of the stoichiometric equivalent amount is preferred. As alternately expressed, from about 40% to about 80% excess is used and about 60% to about 65% is preferred.

It has also been found that although the level of europium has little effect upon the brightness of the phosphor, the amount used significantly effects the color purity of the emission of the phosphor. A molar ratio of europium to yttrium of from about 4.0:96 to about 5.5:94.5 yields a phosphor that emits a red color having an $x$ color co-ordinate ranging from about .655 to about .660 and a $y$ color co-ordinate of from about .335 to about .340. Appreciable variations from the above ratios change the color co-ordinates significantly. It is preferred, therefore, to use a molar ratio of europium to yttrium as close to 5:95 as is possible.

The bismuth concentration should be from about 600 p.p.m. to about 900 p.p.m. calculated on the $Y_2O_3$ basis to achieve phosphors having improved brightness and satisfactory color of emission. Especially preferred are amounts of bismuth from about 750 to 760 p.p.m.

After the above-mentioned raw materials are mixed together in the amounts specified they are heated to a temperature of from about 1750° F. to about 1800° F. for at least about 120 minutes to convert the materials into the phosphor. The resulting phosphor is thereafter generally washed with caustic at about 80° C. to remove the excess vanadate and thereafter dried.

After cooling the phosphor to about room temperature it is added to a 20% by weight aqueous sodium hydroxide solution and heated to about 80° C. The solution is digested for about 30 minutes at about 80° C. and the phosphor is washed with deionized water until all sodium hydroxide is removed. The phosphor is filtered and dried at about 150° C. for about 2 hours. The phosphor is then screened through a 325 mesh stainless steel screen.

To more fully illustrates the subject invention the following detailed examples are presented. All parts, proportions and percentages are by weight unless otherwise indicated. In the following examples the standard is a bismuth containing europium-activated yttrium vanadate containing about 200 p.p.m. of bismuth and a molar ratio of europium to yttrium of about 4.5:95.5 and is typical of the material produced according to U.S. Pat. 3,360,674 that was used in commercial color television sets prior to this invention.

EXAMPLE 1

Effect of cerium impurity

Various phosphors are made following the procedure given below. About 28.6 parts of yttrium oxalate and about 1.9 parts europium oxalate are precipitated together to form a solid having a molar ratio of europium to yttrium of 4:96. About 757 p.p.m. of bismuth is added as $Bi_2O_3$. The oxalates and bismuth are mixed with 22.6 parts of ammonium metavanadate and fired at 972° C. to form a phosphor. The phosphor is washed and dried and tested as given below. The cerium content of the yttrium oxalate varies as shown in Table I. The relative brightness of the phosphors is measured against the standard and is also given in Table I.

TABLE I

| Parts per million cerium ($Y_2O_3$ basis): Less than— | Cathode ray emission percent brightness |
|---|---|
| 5 | 133 |
| 10 | 123 |
| 20 | 114 |
| 30 | 105 |
| 40 | 95 |

The detrimental effect of even minute amounts of cerium is shown.

EXAMPLE 2

Effect of bulk density of ammonium metavanadate

Following the procedure outlined in Example 1 only the cerium content is below 5 p.p.m. and ammonium metavanadates having a variety of bulk densities are used to produce a variety of phosphors. In each instance the metallic impurities are below about 0.01%. The comparative brightness versus the bulk density of the ammonium metavanadate is shown in Table II.

TABLE II

| Bulk density (g./in.³): | Cathode ray tube emission percent brightness |
|---|---|
| 6.5 | 125 |
| 7.8 | 122 |
| 9.5 | 118 |
| 12.5 | 117 |
| 13.5 | 116 |

The foregoing data indicates that a bulk density of less than about 8 g./in.³ is necessary to achieve a brightness increase of about 20%.

EXAMPLE 3

Effect of bismuth level

A variety of phosphors are made using essentially the same procedure as in Example 1 except that the level of bismuth is varied and the cerium content is below 5 p.p.m. Table III below gives the relative brightness at various levels of bismuth.

TABLE III

| Bismuth p.p.m. ($Y_2O_3$ basis): | Cathode ray tube emission percent brightness |
|---|---|
| 200 | 116 |
| 400 | 119 |
| 600 | 120 |
| 760 | 121 |
| 800 | 120 |
| 1000 | 119 |

The above data indicates that from about 600 to about 800 p.p.m. of bismuth yield the highest brightness phosphor.

EXAMPLE 4

Effect of excess vanadate

Following the phosphor synthesis procedure as in Example 1 several phosphors are prepared from mixtures containing various amounts of ammonium vanadate. Cerium, terbium and praseodymium and other rare earth impurity levels are below the 5 p.p.m., 25 p.p.m. and 75 p.p.m., respectively. A heating temperature of about 1782° F. is used and 756 p.p.m. bismuth is added. The percent cathode ray brightness using the standard taken as 100% with various amounts of excess $V_2O_5$ are shown in Table IV below.

TABLE IV

| Amount of $V_2O_5$ percent excess: | Cathode ray emission percent brightness |
|---|---|
| 20 | 117 |
| 40 | 120 |
| 60 | 121 |
| 80 | 121 |
| 100 | 119 |

The above data indicates that from about 40% to about 80% excess amount of vanadate maximizes brightness of the resulting phosphor.

EXAMPLE 5

Effect of temperature of heating

Several phosphors are prepared following essentially the same procedure as in Example 4 except that the vanadate level is at 162% of theory and the heating temperature is varied. The percent brightness of the phosphors as against the standard taken at 100% is measured. Results of the measurements are shown in Table V below.

TABLE V

| Heating temperature ° F.: | Cathode ray tube emission percent brightness |
|---|---|
| 1650 | 114 |
| 1675 | 116 |
| 1700 | 119 |
| 1725 | 120 |
| 1750 | 122 |
| 1775 | 122 |
| 1800 | 122 |
| 1825 | 120 |
| 1850 | 119 |
| 1875 | 118 |

The above data indicates that maximum cathode ray tube brightness is obtained at a heating temperature of from about 1750° F. to about 1800° F.

EXAMPLE 6

Effect of terbium impurities

Phosphors are prepared following essentially the same procedure as in Example 5 except that the level of terbium in the rare earths is varied, and the heating temperature is held constant at 1782° F. Cathode ray tube brightness is measured and compared with the standard at 100%. Results are shown in Table VI following.

TABLE VI

| Terbium content p.p.m. ($Y_2O_3$ basis): | Cathode ray emission percent brightness |
|---|---|
| 0 | 132 |
| 10 | 128 |
| 20 | 126 |
| 30 | 123 |
| 40 | 120 |
| 50 | 117 |
| 60 | 114 |

The above data shows that the higher the level of terbium the lower the brightness. It is believed surprising since terbium increases the brightness of a phosphor that does not contain bismuth. For example, from about 50 to about 200 p.p.m. terbium in a europium-activator yttrium vanadate phosphor without bismuth increases the brightness about 5% over a phosphor without terbium. Additionally, the above data show that to achieve a 20% increase in brightness it is necessary to keep the terbium level below about 20 p.p.m. Substantially similar results are found when praseodymium is the impurity.

EXAMPLE 7

The following raw material mixture is used to obtain a phosphor having the highest level of brightness with an acceptable color.

| Component: | Parts by wt. |
|---|---|
| $Y_2O_3$ | 12.87 |
| $Eu_2O_3$ | 1.05 |
| $NH_4VO_3$ | [1] 22.6 |
| $Bi_2O_3$ | [2] 757 |

[1] 62% excess vanadate $V_2O_5$ basis.
[2] P.p.m. based on $Y_2O_3$ weight.

The components are blended thoroughly and calcined in shallow quartz crucibles at 1782° F. for 120 minutes. The phosphor is cooled and digested for 30 minutes in 500 ml. of 20% sodium hydroxide solution at 80° C. The resultant phosphor is washed until all the sodium hydroxide is removed and then dried at 150° C. for at least 2 hours.

The $Y_2O_3$ above contains less than about 5 p.p.m. cerium, less than about 50 p.p.m. terbium and praseodymium, and less than about 50 p.p.m. total rare earth impurity. Also the bulk density of the ammonium metavanadate is below about 8.0 g./in.$^3$ and contains less than .01% metallic impurities.

The brightness of the phosphor is 133% of the standard and has a color that is acceptable for color television tube manufacture.

While there has been shown and described what are at present considered the preferred embodiments of the invention, it will be obvious to those skilled in the art that various changes and modifications may be made therein without departing from the scope of the invention as defined by the appended claims.

What is claimed is:
1. In a process for producing an improved europium-activated yttrium vanadate phosphor containing a bismuth additive, the steps comprising
 (a) forming a relatively uniform mixture of a yttrium source selected from the group consisting of yttrium oxide, yttrium oxalate and mixtures thereof, a europium source selected from the group consisting of europium oxide, europium oxalate and mixtures thereof, a bismuth source and ammonium metavanadate; said mixture containing an impurity level of less than about 5 p.p.m. of cerium, less than about 25 p.p.m. of terbium and praseodymium and less than about 50 p.p.m. of other rare earth, said impurity level based upon the yttrium source on a yttrium oxide basis, said mixture having a molar ratio of Eu:Y of from about 4:96 to about 5.5:94.5, said bismuth being present in amounts of from about 600 to about 900 p.p.m. based on the yttrium source on an oxide basis, said ammonium metavanadate having a bulk density of less than about 8 grams per cubic inch, and containing less than about 0.01% metallic impurities and being present in amounts of from about 140% to about 180% of the stoichiometrically equivalent amount, and
 (b) heating said mixture to a temperature of from about 1750° F. to about 1800° F. for at least about 120 minutes.

2. A process according to claim 1 wherein said ammonium vanadate is present in amounts of from about 160% to 165% of the stoichiometric equivalent amount.

3. A process according to claim 1 wherein the molar ratio of Eu:Y is about 5.

4. A process according to claim 3 wherein the bismuth is about 750 p.p.m. to about 760 p.p.m.

5. A process according to claim 4 wherein the cerium impurity level is less than 5 p.p.m.

6. A process according to claim 5 wherein the terbium and praseodymium levels are each less than 20 p.p.m.

References Cited
UNITED STATES PATENTS 3,360,674  12/1967  Mikus et al. _____ 252—301.4 R ROBERT D. EDMONDS, Primary Examiner